United States Patent
Boegli et al.

(10) Patent No.: US 10,183,318 B2
(45) Date of Patent: Jan. 22, 2019

(54) METHOD AND DEVICE FOR PRODUCING A STRUCTURED SURFACE ON A STEEL EMBOSSING ROLLER

(75) Inventors: Charles Boegli, Marin-Epagnier (CH); Steffen Weissmantel, Chemnitz (DE); Günter Reisse, Chemnitz (DE); Peter Lickschat, Parthenstein (DE); Werner Steffen, Stansstad (CH)

(73) Assignee: Boegli-Gravures S.A., Marin-Epagnier (CH)

(*) Notice: Subject to any disclaimer, the term of this patent is extended or adjusted under 35 U.S.C. 154(b) by 475 days.

(21) Appl. No.: 14/346,578

(22) PCT Filed: Sep. 12, 2012

(86) PCT No.: PCT/EP2012/067858
§ 371 (c)(1),
(2), (4) Date: Mar. 21, 2014

(87) PCT Pub. No.: WO2013/041430
PCT Pub. Date: Mar. 28, 2013

(65) Prior Publication Data
US 2014/0217058 A1  Aug. 7, 2014

(30) Foreign Application Priority Data

Sep. 23, 2011 (EP) .................................. 11182573
Jul. 24, 2012 (EP) .................................. 12177682

(51) Int. Cl.
*B23K 26/00* (2014.01)
*B21B 27/00* (2006.01)
(Continued)

(52) U.S. Cl.
CPC ........ *B21B 27/005* (2013.01); *B23K 26/0624* (2015.10); *B23K 26/355* (2018.08); *B23K 2101/04* (2018.08); *B41C 1/05* (2013.01)

(58) Field of Classification Search
CPC .............................. B23K 26/00; B23K 26/36
(Continued)

(56) References Cited

U.S. PATENT DOCUMENTS 4,959,275 A * 9/1990 Iguchi ................... B21B 27/005
101/32
5,416,298 A  5/1995 Robert
(Continued)

FOREIGN PATENT DOCUMENTS

CN  1297799 A  6/2001
CN  1740915 A  3/2006
(Continued)

OTHER PUBLICATIONS

International Search Report; PCT/EP2012/067858; dated Jan. 11, 2013; 3 pages.
(Continued)

*Primary Examiner* — Dana Ross
*Assistant Examiner* — Ayub Maye
(74) *Attorney, Agent, or Firm* — Foley & Lardner LLP

(57) ABSTRACT

A method for structuring a steel embossing roller surface includes using a short pulse laser including at least one of a femtosecond laser and a picosecond laser. The structuring is macrostructuring with dimensions of over 20 μm and depths up to 150 μm and more. The short pulse laser has: in single pulse operation, a fluence in the range of 0.5 J/cm² to 3.5 J/cm², and in burst operation, a mean burst fluence of 0.5 J/cm² to 70 J/cm² per pulse; a wavelength of 532 nm to 1064 nm; a repetition rate of 1 kHz to 10 MHz; a pulse to pulse spacing on the roller of 10% to 50% of the beam diameter for the femtosecond laser and of 10-25% and 40-50% of the beam width for the picosecond laser; a laser pulse position near the roller surface; and deflection velocities of up to 100 m/s and more.

11 Claims, 2 Drawing Sheets

Figure 1:
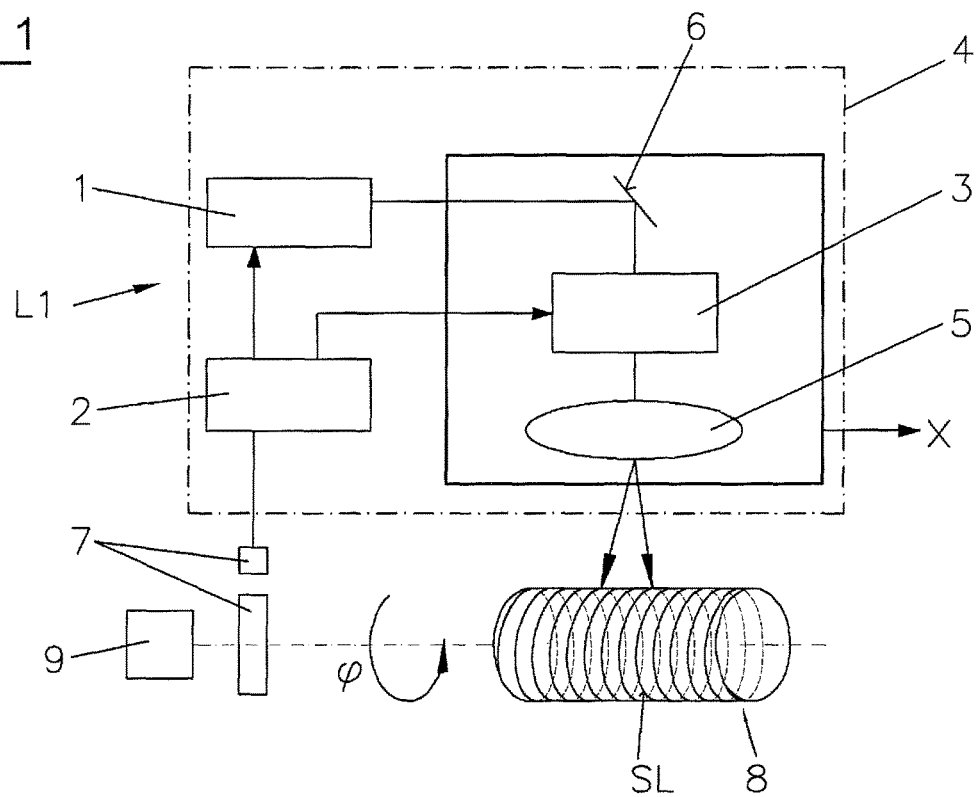

(51) Int. Cl.
*B23K 26/0622* (2014.01)
*B23K 26/352* (2014.01)
*B41C 1/05* (2006.01)
*B23K 101/04* (2006.01)

(58) Field of Classification Search
USPC .............. 219/121.6, 121.67, 121.68, 121.69, 219/121.73, 121.74
See application file for complete search history.

(56) References Cited

U.S. PATENT DOCUMENTS

| | | | | |
|---|---|---|---|---|
| 5,751,436 | A * | 5/1998 | Kwon | H04N 1/10 219/121.68 |
| 5,856,648 | A * | 1/1999 | Frauchiger | B23K 26/0823 219/121.61 |
| 6,103,990 | A * | 8/2000 | Barenboim | B23K 26/067 219/121.68 |
| 6,147,322 | A * | 11/2000 | Xuan | B23K 26/0084 219/121.68 |
| 6,621,040 | B1 * | 9/2003 | Perry | A61B 18/20 219/121.67 |
| 7,036,347 | B2 | 5/2006 | Boegli | |
| 7,050,208 | B2 * | 5/2006 | Overbeck | G02B 21/002 359/201.1 |
| 7,229,681 | B2 | 6/2007 | Boegli | |
| 7,647,698 | B2 * | 1/2010 | Closmann | B22F 3/1055 29/895 |
| 8,253,067 | B2 * | 8/2012 | Chen | B23K 26/02 219/121.67 |
| 8,487,208 | B2 * | 7/2013 | Kobayashi | B23K 26/0853 219/121.61 |
| 2001/0009250 | A1 * | 7/2001 | Herman | A61F 9/00802 219/121.69 |
| 2002/0066377 | A1 * | 6/2002 | Gelbart | B41C 1/05 101/32 |
| 2003/0045412 | A1 * | 3/2003 | Schulz | B31F 1/07 492/30 |
| 2003/0218274 | A1 * | 11/2003 | Boutilier | B31F 1/07 264/284 |
| 2003/0222324 | A1 * | 12/2003 | Sun | B23K 26/04 257/431 |
| 2007/0199927 | A1 * | 8/2007 | Gu | B23K 26/04 219/121.69 |
| 2007/0296203 | A1 * | 12/2007 | Golan | B42D 25/29 283/72 |
| 2008/0081132 | A1 * | 4/2008 | Bourdelais | G02B 5/0221 428/1.1 |
| 2008/0248206 | A1 * | 10/2008 | Della Torre | B31F 1/07 427/331 |
| 2010/0108651 | A1 * | 5/2010 | Stahr | C03C 23/0025 219/121.69 |
| 2010/0116799 | A1 * | 5/2010 | Momoi | B23K 26/0823 219/121.71 |
| 2010/0197116 | A1 * | 8/2010 | Shah | B23K 26/38 438/463 |
| 2011/0048254 | A1 * | 3/2011 | Espe | B23K 26/0084 100/35 |
| 2011/0240617 | A1 * | 10/2011 | Xu | B23K 26/00 219/121.72 |

FOREIGN PATENT DOCUMENTS

| | | |
|---|---|---|
| CN | 101448603 A | 6/2009 |
| CN | 101571603 A | 11/2009 |
| EP | 1 245 326 | 10/2002 |
| EP | 2 027 994 A2 | 2/2009 |
| EP | 2 327 502 A1 | 6/2011 |
| EP | 2 327 503 A1 | 6/2011 |
| EP | 2 336 823 A1 | 6/2011 |
| JP | 2008-211589 A | 9/2008 |
| RU | 2368504 C1 | 9/2009 |
| WO | WO-97/19783 | 6/1997 |
| WO | WO 2007/012215 | 2/2007 |
| WO | WO 2009/010244 A1 | 1/2009 |
| WO | WO 2009/155720 A1 | 12/2009 |

OTHER PUBLICATIONS

First Office Action dated Feb. 17, 2015 in related Chinese Appl. 201280052466.5 with English-language translation (15 pgs.).

Inquiry Under Substantive Examination dated Jul. 21, 2016 in related Russian Appl. 2014115284/02(023868) with English-language translation (16 pgs.).

Second Office Action dated Sep. 15, 2015 in related Chinese Appl. 201280052466.5 with English-language translation (9 pgs.).

Zhong, M. et al. "Applications of Laser Nano Manufacturing Technologies." Chinese Journal of Lasers, vol. 38, Issue 6, Jun. 2011 (11 pgs).

* cited by examiner

METHOD AND DEVICE FOR PRODUCING A STRUCTURED SURFACE ON A STEEL EMBOSSING ROLLER

This application is the National Phase of PCT/EP2012/067858, filed Sep. 12, 2012, which claims priority to European application No. 11182573.3, filed Sep. 23, 2011 and European application No. 12177682.7, filed Jul. 24, 2012, the disclosures of which are hereby incorporated by reference in their entirety.

The present invention relates to a method and a device for producing a structured surface on a steel embossing roller.

Steel embossing rollers e.g. for embossing foils that serve as so-called innerliners for packaging cigarettes are mainly known through the applicant of the present invention, e.g. from WO-2009/155720, U.S. Pat. No. 7,036,347, or EP 2 336 823. By means of such embossing rollers, the foils are simultaneously satinized, i.e. homogenously provided with very fine pits on large areas, and provided with logos, the teeth of the embossing roller being either completely or partly removed in the locations of these logos. Furthermore, the teeth and/or gaps on the embossing rollers may be shaped so as to provide foils with authentication features and/or reinforcements and the like. Moreover, according to EP 2 027 994 A2 to the applicant of the present invention, there are embossing rollers that are designed as folding rollers.

Accordingly, the embossing rollers of the prior art have very fine teeth in the case of a so-called pinup configuration or pits corresponding to the teeth in the case of a co-called pindown configuration, as well as gaps which produce unembossed logos, and the teeth may have superposed microstructurings, as e.g. according to U.S. Pat. No. 7,229,681.

The foils, which have a thickness of approx. 5 µm to approx. 400 µm, include thin metal foils, e.g. aluminum foils, synthetic foils of all kinds, foils having a hybrid composition of paper and/or synthetic layers, possibly provided with a metallization, and the like. They also include the important class of the aforementioned innerliners that are e.g. used in cigarette packages and may e.g. consist of metallized paper.

Furthermore it will be noted that although purely mechanical machining yields very good qualitative and quantitative results, the possibilities are limited in accordance with the dimensions of the machining tools. Mechanical machining always leaves burs or other unwanted and objectionable traces. Above all, large roller surfaces having complementary positive/negative—male/female—or pinup-pindown structures that can be paired without selection cannot be produced without enormous expenditure.

In RU-2368504 it is suggested to produce mainly the logo gaps by electro-erosion or electrochemically whereas the teeth can be manufactured in the same way or mechanically. On homogenous materials such as copper this is possible in a high quality whereas the granular basic structure of steel makes direct machining of the surface in a high quality more difficult. With the current techniques, these methods are unsuitable for a rational industrial production as they are extremely time- and material-consuming.

With the current ablating laser systems of the neodymium-YAG type having pulse widths around 30 ns it is possible to achieve a somewhat finer machining down to a line spacing of approx. 70 µm at a depth of approx. 100 µm on smaller surfaces.

Furthermore, in WO-2007/012215 A1, EP-2 327 502 A1, and EP-2 327 503 A1, all to the applicant of the present invention, laser systems are disclosed that are suitable for producing very fine structures such as grating structures on embossing rollers, lasers having pulse lengths in the nano- to femtosecond range being used for producing gratings in the nanometer range.

These methods are well suitable for microstructuring small surface areas in the micrometer and submicrometer range but not for the intended direct large-surface macro-machining of steel with structural details of approx. 20 µm and up in the embossed surface. Rollers having hard steel surfaces are interesting, however, since they allow directly and quickly embossing foils and more particularly innerliners, these foils being thin and relatively inelastic and perfectly suitable for food safe packaging due to their water vapor impermeability.

There is a need, however, to provide large surface areas, e.g. an entire embossing roller or possibly a plurality of identical rollers quickly, congruently or with intentional differences, i.e. with high absolute and relative precision, with structures from 20 µm up to 400 µm and depths up to 400 µm, such structures comprising teeth and associated pits, as the case may be.

A known engraving method by means of laser on plastic-coated cylinders uses digitally stored data representing an image resolved in pixels. These pixels usually produce pits in the form of small cups. An acousto-optical modulator is used to modulate the intensity of the laser beam in a number of intensity grades, thereby producing, e.g. according to EP 1 245 326, shades of gray or differences in brightness when the printing mould is impressed e.g. on a foil. In this case, due to the arrangement of the focal points in a two-dimensional dot matrix, the closely adjacent engravings of the dot matrix influence each other adversely. Considerable heat generation or an undesirable alteration of the material or of the local embossing pattern may result. Furthermore, the substantial quantities of ablation residues and of particles blasted off from the surface in the vicinity of the cups are objectionable. Finally, the process is worked off in the form of so-called block structures within the thus defined surface areas of e.g. 10 mm×10 mm.

The next block is machined after performing mechanical movements that may entail a discontinuity as well as shocks which have to be relaxed before the machining operation. Excessive leaps may cause air turbulences, which may complicate the continuous evacuation of the residues.

From WO-97/19783 it is known to use two separate lasers for laser engraving, one for fine engraving and a second one for deep engraving. No specific indications on the kind, the power, and the pulse duration, on one hand, and on the engraving depth are disclosed, however.

U.S. Pat. No. 5,416,298 and WO-2009/010244 A1 disclose a laser engraving apparatus that is suitable for engraving rotating printing moulds and does not exhibit some of the mentioned disadvantages regarding the block by block technique. Engraving is performed at very high speed and in high quality in a helical line. A substantial advantage is that due to the application of a deflection unit, e.g. an acousto- or electro-optical modulator, each point of the surface is treated by multiple laser pulses rather than by a single laser pulse. The time interval between the impingement of the individual pulses can be chosen large enough to avoid a mutual interference or a thermal overload.

However, the data that are relevant for producing the aforementioned embossing rollers with macrostructures, i.e. a very large number of teeth having a height of 0.1 to 0.4 mm, and toothless surfaces for producing logos of the most diverse kinds or other structures, in which machining no melting and softening of the material should occur in spite of the massive increase in overall and local heating as it is observed in laser systems of the prior art, are not disclosed.

Indeed a large number of commercially available laser systems are known today which might enable the desired structuring of the surfaces of steel rollers, but only if they are provided with a suitable beam control taking account of the parametrization of the invention.

In summary, therefore, although it is possible to produce very fine teeth having tip to tip spacings down to 0.1 mm and sharp logos by mechanical means, and laser systems for producing very fine grating structures are known, there is a growing need, and as a result it is an object of the invention, to produce finer surfaces with macrostructures on steel embossing rollers faster and even more precisely, thereby allowing a greater diversity of design possibilities, e.g. variable tooth spacings and shapes, as well as the industrial manufacture of male-female rollers as well as a versatile application for the most diverse foil materials.

This object is attained by the method and the device described in the embodiments of the present application, according to which particular parameters for a suitable control of the ablation process under specific conditions are indicated.

Figure 2:
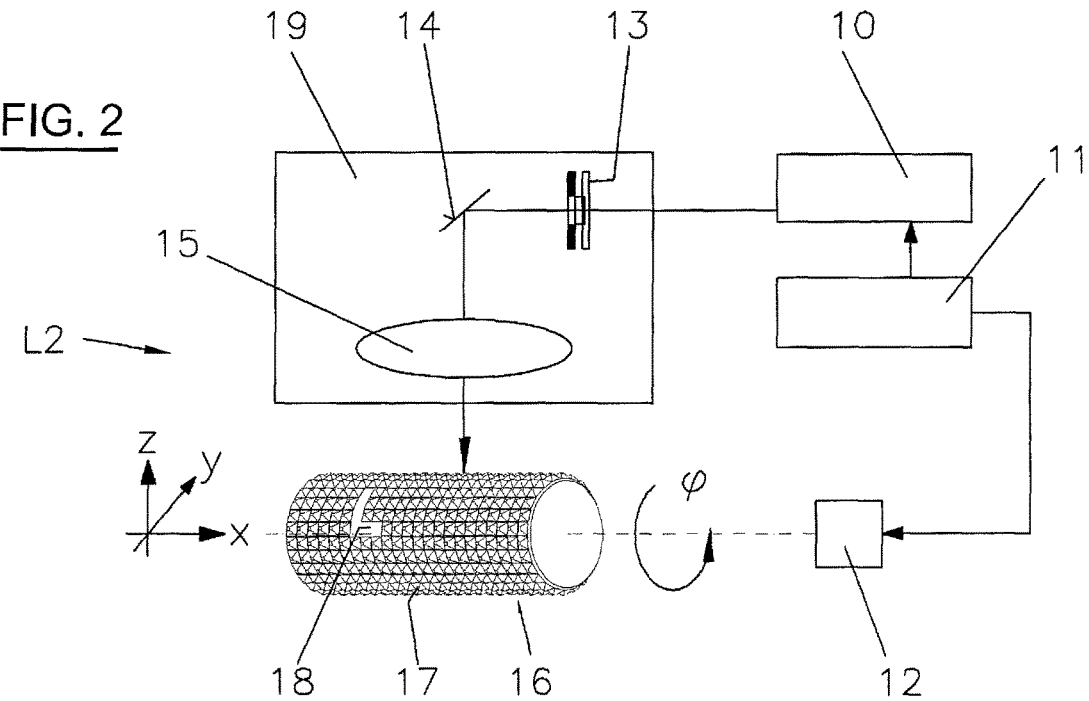
Figure 3:
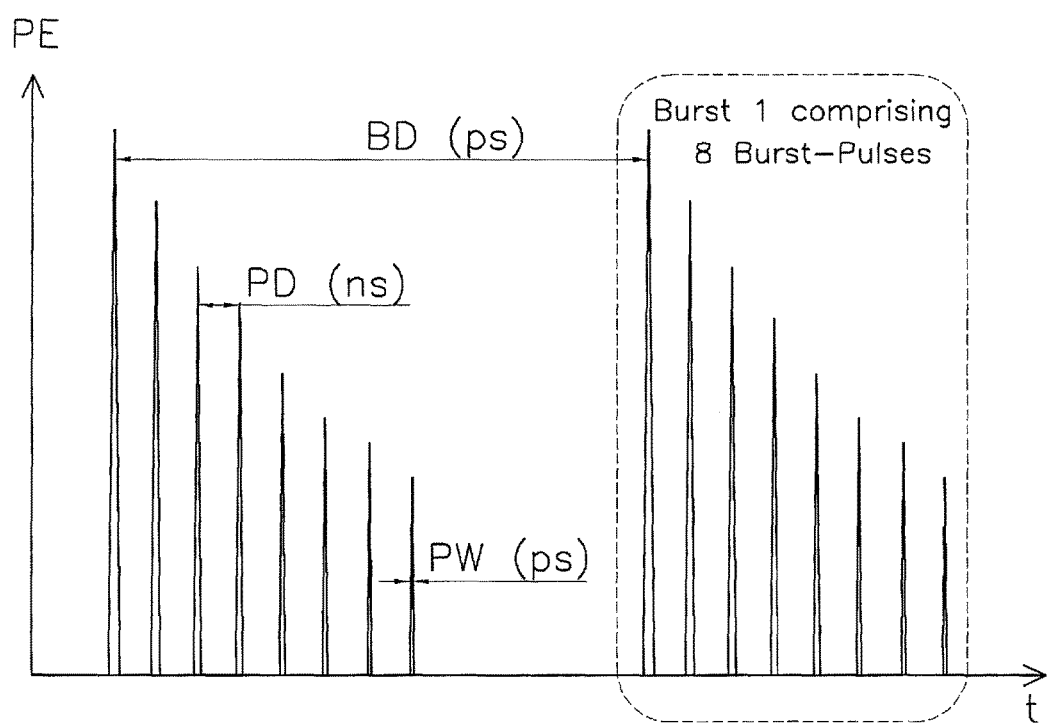

The invention will be explained in more detail hereinafter with reference to schematized drawings of exemplary embodiments where FIG. 1 shows a first exemplary embodiment of a laser system of the invention for continuous engraving, FIG. 2 shows a second exemplary embodiment of a laser system of the invention for block by block engraving, and FIG. 3 shows a schematic illustration of laser bursts.

One essential novelty of the described method is the possibility of providing modern materials with macrodimensional surface structures having engraving dimensions of over 20 μm, more particularly also of over 70 μm, and engraving depths of up to 400 μm, which is otherwise impossible with the conventional laser machining methods. In macrotechnology there is a great need to be able also to structure the surfaces of heterogeneous, high-alloyed iron base materials, which become increasingly important in manufacturing technology, with surface structures. The heterogeneous structural composition of these materials is indispensable for the special properties of the roller surfaces that are required.

These different structural phases have very different physical properties, however, leading to corresponding differences in local macroscopic behavior during laser machining. Therefore, up to now, these materials could not be laser macrostructured economically as required. With the novel method as disclosed below such materials can now be macrostructured also. The novel method is combinable with a microstructuring process and is therefore capable of producing structures of highest resolution even on these complex, heterogeneous materials, which represents a breakthrough in the field of materials technology.

The machining of printing cylinders for offset printing or of other rotary printing moulds using short pulse lasers has been known per se for some time. The thermally ablating laser machining techniques by means of e.g. YAG:Nd lasers in the pulse width range of 30 ns and above that are known today allow engraving steel surfaces in dimensions of more than approx. 70 μm at a depth of approx. 100 μm, but fine relief structures cannot be produced reliably and quickly since the ablation depth is difficult to control and other effects affect the obtainable surface quality.

For producing embossing rollers having different structures it is advantageous to shape them by means of different laser devices so as to be able to supplement the macrostructures with microstructures at a different resolution using different focus spot sizes and different powers.

For a subsequent microstructuring process, the short pulse lasers available today operate at wavelengths of 700 nm to 2100 nm, thereby allowing a corresponding resolution of the engraving below 1 μm. An even higher resolution is possible by a frequency multiplication of the laser radiation. As the case may be, the superposition of a finer structure would allow producing a hologram directly on the embossing roller for subsequent transmission onto the foil. In this case it may be advantageous to provide the already macrostructured roller with a coating e.g. of ta-C.

FIG. 1 schematically illustrates a first laser system L1 that is intended for continuous engraving=macrostructuring. L1 includes a laser 1 that is connected to a control circuit 2 that controls laser 1 and a deflection unit 3 which may comprise beam splitters as well as acousto-optical or electro-optical modulators or polygon mirrors. Deflection unit 3, focusing optics 5, and deflection mirror 6 form engraving unit 4 that is linearly displaceable in the X axis as symbolically indicated by the X arrow. Alternatively, the entire laser device L1 may be displaceable in the X axis.

Control circuit 2 is connected to a position detector 7 for detecting and evaluating the data of the rotating workpiece 8, in this case an embossing roller blank. The workpiece is driven by a drive 9. By the combination of the linear displacement of the engraving unit and of the rotation of the roller a constant helical line SL is created that allows a uniform machining.

The application of a deflection unit that may e.g. comprise one or multiple beam splitter(s) as well as electro-optical or acousto-optical modulators or one or multiple polygon mirrors allows splitting the initial laser beam into two or multiple laser beams impinging on two or multiple tracks simultaneously but at such a mutual distance that they do not interfere. Moreover, the time interval between the impingement of the individual pulses can be chosen large enough to avoid a thermal overload.

FIG. 2 shows a laser system for block by block machining of the workpiece which also allows the desired macrostructuring with a suitable choice of the parameters. Laser system 2 comprises a laser device 10 that is connected to a control circuit 11 which is in turn connected to a rotary drive 12.

Through a mask and diaphragm combination 13, laser beam LA reaches a deflection mirror 14 and subsequently impinges on workpiece 16 via a focusing optics 15 that forms engraving unit 19 together with the aforementioned components. The workpiece is depicted here as a macrostructured embossing roller having teeth 17 and a logo gap 18. In this embodiment variant, the workpiece is displaceable in the three coordinate directions and rotatable by means of rotary drive 12. For certain applications, this principle may also be used in a machining operation according to FIG. 1. Also, a combination of both displacement methods is possible.

By the application of short pulse lasers whose laser pulses are comprised between 10 femtoseconds and 100 picoseconds, the energy is applied in a very short time period so that a so-called "cold ablation" becomes possible where the material is evaporated very quickly without an inacceptable heating of the adjacent material. The undesirable liquid state of the material that produces crater edges and splashes can thus be almost completely avoided. Therefore, such lasers can also be successfully used for the so-called block by block machining according to FIG. 2.

As already mentioned it is an object of the present invention to produce steel embossing rollers, in particular, which have a very large number of small teeth as well as areas without teeth or with modified teeth where both the tooth shape, e.g. pyramidal with a square or rectangular horizontal projection, or frustoconical, and the tooth height and the pitch, i.e. the spacing of the teeth may vary, or male-female structures where the female structures are associated to the male structures, or folding or perforating tools and the like.

An economically reasonable industrial utilization of high performance ps systems for the aforementioned structures was not possible until now. In particular, in contrast to the production of printing moulds, no solution could be found for machining steel rollers in the required piece number. The granularity of this material and the inhomogeneities in the mixture of the components precluded this.

During extensive research aiming to structure steel up to depths of 400 μm with small roughness values, different problems arose which made an application for the intended macro-embossing impossible, in addition to the above-described problems in macro-machining. Specifically, due to structural differences and other material dependencies, hardly eliminable bulges and holes resulted after the laser machining.

It was also found that the theoretical ablation volume calculated per pulse and repetition frequency strongly deviates from the actual ablation rate. Consequently, no technically utilizable parameters and relationships existed for contemplating an industrial application of short pulse technology to steel.

After prolonged tests, the following parameter combination was found that enables one skilled in the art to implement the engraving of steel rollers in the reproduction accuracy and quality required for fine embossing technology. In this context, among the short pulse lasers, a differentiation can be made between the femtosecond (fs) lasers and the picosecond (ps) lasers with pulse durations ranging from 10 fs to 100 ps.

Besides the predetermined pulse duration that is a function of the laser type, a large number of parameters are relevant for the intended industrial utilization, particularly but not exclusively in steel engraving.

For lasers in single pulse mode, these include:
a) fluence,
b) wavelength,
c) repetition rate,
d) pulse to pulse spacing on the workpiece,
e) position of the laser beam focus plane resp. of the laser beam imaging plane relative to the surface of the substrate,
f) deflection velocity.

Until recently, the available beam guide systems were not able to guide the laser power onto the surface being engraved in the required quality and processing time since the required deflection velocities of over 100 m/s could not be attained in keeping with the required accuracy of the machining process. For structure widths of e.g. 100 μm, the Gaussian beam radius should not exceed 15 μm, which additionally requires a very good command of the laser beam positioning accuracy as defined by the fineness of the structure to be produced on the substrate.

In further research it was found that the desired machining of embossing rollers by means of single pulses can be substantially improved when different pulse sequences are used. Thus, a particular operating mode developed for selected ps laser types, the burst mode in the technical literature, produces good results in steel engraving. In the burst mode, as opposed to the above-described single pulse operation of a ps laser at a predetermined repetition rate, rather than ps laser beam pulses, ps laser beam bursts are generated with a temporal pulse to pulse spacing of the single bursts in the range of tens of nanoseconds, typically 20 ns, and a temporal burst to burst spacing in the range of $10^{-3}$ to $10^{-7}$ seconds, typically 10 μs, i.e. with a burst repetition frequency or repetition rate of the laser of 1 kHz to 10 MHz, see FIG. 3.

FIG. 3 shows a strongly schematic illustration of an example of bursts where the x axis is the time axis and the pulse energy is charted on the y axis.

The maximum possible repetition rate of the ps laser in burst mode is dependent upon and limited by the number of single pulse in the burst. The pulse duration of the single pulses of the ps laser and the pulse durations of the pulses in burst mode are comparable.

A burst may comprise an adjustable number of up to 20 single ps pulses. The pulse energy of the single pulses in the burst may exponentially decrease according to a function that is typical of the laser apparatus while the temporal pulse to pulse spacing of the single pulses in the burst remains the same, or the characteristic of the pulse energy of the single pulses in the burst may be predetermined, so that a constant pulse energy of the pulses in the burst or a decrease or an increase of the pulse energy of the pulses in the burst or alternatively first a decrease and then again an increase of the pulse energy of the pulses in the burst are possible.

Furthermore, one pulse or multiple pulses in the burst may be blanked, e.g. in the "FlexBurst™-Mode" of the laser types "Time-Bandwidth Duetto™" and "Time-Bandwidth Fuego™" of the "Time-Bandwidth Products" company. A frequency doubling or frequency tripling or further frequency multiplication, SHG or THG, of the laser radiation is also possible in burst mode operation of the ps laser.

Thus, for lasers in burst mode, the following parameters apply:
g) number of single pulses in the burst,
h) pulse duration of the single pulses in the burst,
i) temporal pulse spacing of the single pulses in the burst,
j) mean burst fluence on the workpiece,
k) beam focus radius on the workpiece, and
l) distribution of the burst fluence on the single pulses.

Possible machining parameters and results in the operation of the ps laser in burst mode are e.g.:
number of pulses in burst up to 20,
fluence of burst 0.5-70 J/cm$^2$,
ablation depth per burst up to 100 nm,
ablation volume per burst up to 100 μm$^3$,
bottom roughness of the produced structures from 450 nm to 1000 nm at structure depths of 60 μm to 200 μm.

The advantages of burst mode machining as compared to ps laser machining with single pulses are:

Higher ablation rates in the structuring of metallic materials as compared to ps pulse irradiation with single pulses having the same energy as the total burst energy, i.e. at equal fluences of the single pulses and of the bursts and at the same pulse to pulse spacing and overlap of the single pulses and of the bursts, i.e. at the same repetition rate of the single pulses as the burst repetition rate.

A better quality, in particular lower surface roughnesses of the produced structure shapes as compared to ps pulse irradiation with single pulses having the same overlap, also at higher fluences of the burst.

In burst mode, higher total burst energies, i.e. higher fluences of the burst can be applied to the workpiece surface in the structuring process. Since, due to the number of pulses in the burst, the pulse energies of the single pulses in the burst are correspondingly lower than in the case of single pulses having the same pulse energy as the total burst energy, the fluences of the single pulses in the burst are also substantially lower than the fluence of the single pulses; in burst mode, machining is thus carried out in the "low fluence regime", i.e. not substantially above the ablation threshold, and a higher quality of the produced structural shapes is obtained, as could be demonstrated. When structuring with single pulses, high pulse energies cannot be used in this manner since machining would already take place in the "high fluence regime", i.e. far above the ablation threshold, and the quality of the produced structures would be lower.

The parameters indicated above may e.g. take the following values. For single pulse operation, these are:

a) Fluence:

fs laser: For machining with femtosecond pulses, a fluence range of 0.5 J/cm$^2$ to 3.5 J/cm$^2$ is suggested. Tests with higher fluences were not found to be satisfactory.

ps laser: In the tests it was found that high fluences are not suitable for machining with picosecond pulses. The applicable fluence range should be situated shortly above the ablation threshold. Fluences of 0.5 J/cm$^2$ to 10 J/cm$^2$ were tested and it was found that the range from 0.5 to 3 J/cm$^2$ yielded the best machining results.

b) Wavelength:

Three different wavelengths were used, namely 775 nm, 1030 nm, and 1064 nm, and a frequency doubling was performed at 1064 nm that resulted in a halving of the wavelength to 532 nm. It was found that the wavelength affects the result due to the different absorption coefficients. Higher wavelengths do not seem suitable for machining due to the low absorption coefficient. Thus, a range of 532 nm to 1064 nm results for the intended machining.

c) Repetition rate:

Tests were conducted with pulse repetition frequencies up to 1 MHz. It was found that good results were obtainable up to this frequency. However, the result slightly deteriorated at higher pulse repetition frequencies. One way to avoid these high frequencies and still to achieve a high productivity is beam splitting. Thus, for example, 400 W short pulse lasers are commercially available whose beam is split into 8 partial beams for simultaneous machining. In this manner, the repetition rate remains at approx. 1 MHz. Suggested is a repetition rate of 1 kHz to 10 MHz.

d) Pulse to pulse spacing on the workpiece:

It was found that the ablation rate was reduced by a greater overlap of consecutive pulses. This is due to the fact that the following pulse is shielded by the preceding pulse. Therefore, a high pulse to pulse spacing on the workpiece should be chosen.

ps laser: Suggested range for machining: 40-50% of the beam diameter as the pulse to pulse spacing on the workpiece for small pulse machining densities. At higher densities, a smaller overlap in the range of 10%-25% should be contemplated.

fs laser: A pulse to pulse spacing on the workpiece of 10%-50% of the beam diameter.

e) Position of the laser beam focus plane relative to the surface of the substrate:

In all tests the focus was positioned on the surface of the workpiece. Placing the focus above the workpiece is not advisable. It is therefore suggested to position the focus at, i.e. on or slightly below the workpiece surface.

f) Deflection velocities up to 100 m/s and above were tested and found to be applicable.

Beam Diameter:

In the tests, different beam diameters were used. This parameter does not greatly affect the machining operation.

Pulse Width:

The pulse widths used were 150 fs, 178 fs, and 12 ps. All pulse widths were suitable for machining. The pulse width may possibly be further increased to obtain an even higher ablation rate while maintaining a good quality. Smaller pulse widths yield a better quality but are associated with a lower ablation rate. Consequently, for the intended machining, a pulse width range of 150 fs to 12 ps is suggested.

Additionally, for machining in burst mode, the following typical but not limiting values were found:

h) pulse duration of the single pulses in the burst 5 ps to 15 ps, i) temporal pulse spacing of the single pulses in the burst 10 ns to 30 ns, j) mean burst fluence on the workpiece 0.5 J/cm$^2$ to 70 J/cm$^2$, k) beam focus radius on the workpiece 10 µm to 50 µm, the characteristic of the pulse energy of the single pulses in the burst being gradually reduced, increased, or adjusted in a predetermined manner.

The values of b) to g) also apply to burst operation analogously unless they deviate specifically.

The invention claimed is:

1. A method for producing a structured surface on a steel embossing roller by a laser beam of a short pulse laser including at least one of a femtosecond laser and a picosecond laser via a deflection unit, the structured surface being macrostructured with dimensions of over 20 µm and depths up to 150 µm and more that is produced by the short pulse laser using a parameter combination of: a fluence in a range of 0.5 J/cm$^2$ to 70 J/cm$^2$, a wavelength of 532 nm to 1064 nm, a repetition rate of 1 kHz to 10 MHz, and deflection velocities of up to 100 m/s and more at a surface of the steel embossing roller caused by the deflection unit, and wherein the picosecond laser is operated in a burst mode with the parameters: a number of single pulses in a burst of 2 to 20, a pulse duration of the single pulses in the burst of 5 ps to 15 ps, a temporal pulse spacing of the single pulses in the burst of 10 ns to 30 ns, a mean burst fluence on the steel embossing roller of 0.5 mJ/cm$^2$ to 70 J/cm$^2$, and a beam focus radius on the steel embossing roller of 10 µm to 50 µm, a characteristic of a pulse energy of the single pulses in the burst being gradually varied or adjusted in a predetermined manner.

2. The method according to claim 1, wherein the steel embossing roller is continuously machined by displacing an impingement point of the laser beam by the deflection unit on a surface of the steel embossing roller simultaneously in an X axis and on a circumference of the steel embossing roller.

3. The method according to claim 1, wherein the steel embossing roller is machined block by block by being both displaced in all three coordinate directions and rotated.

4. The method according to claim 1, wherein an energy of the single pulses of the laser beam of the burst decreases with increased time.

5. The method according to claim 1, wherein the mean burst fluence is about 10 J/cm$^2$.

6. The method according to claim 1, wherein the short pulse laser includes at least the femtosecond laser, and wherein the parameter combination further includes:

a pulse to pulse spacing on the steel embossing roller of 10% to 50% of a diameter of the laser beam of the femtosecond laser, and a position of a focus plane of the laser beam near a surface of the steel embossing roller.

7. The method according to claim 1, wherein the short pulse laser includes at least the picosecond laser, and wherein the parameter combination further includes:

a pulse to pulse spacing on the steel embossing roller of 10% to 25% of a diameter of the laser beam of the picosecond laser, and a position of a focus plane of the laser beam near a surface of the steel embossing roller.

8. The method according to claim 1, wherein the short pulse laser includes at least the picosecond laser, and wherein the parameter combination further includes:

a pulse to pulse spacing on the steel embossing roller of 40% to 50% of a diameter of the laser beam of the picosecond laser, and a position of a focus plane of the laser beam near a surface of the steel embossing roller.

9. The method according to claim 1, wherein the structured surface produced on the steel embossing roller is comprised of macrostructures with dimensions up to 400 μm formed by the laser beam.

10. The method according to claim 1, wherein the deflection velocities are 100 m/s and more.

11. The method according to claim 2, wherein the laser beam is displaced in the X axis and the steel embossing roller is simultaneously rotated.

* * * * *